Aug. 13, 1935. O. U. ZERK 2,011,134
WHEEL AND WHEEL COVER
Filed Dec. 12, 1932
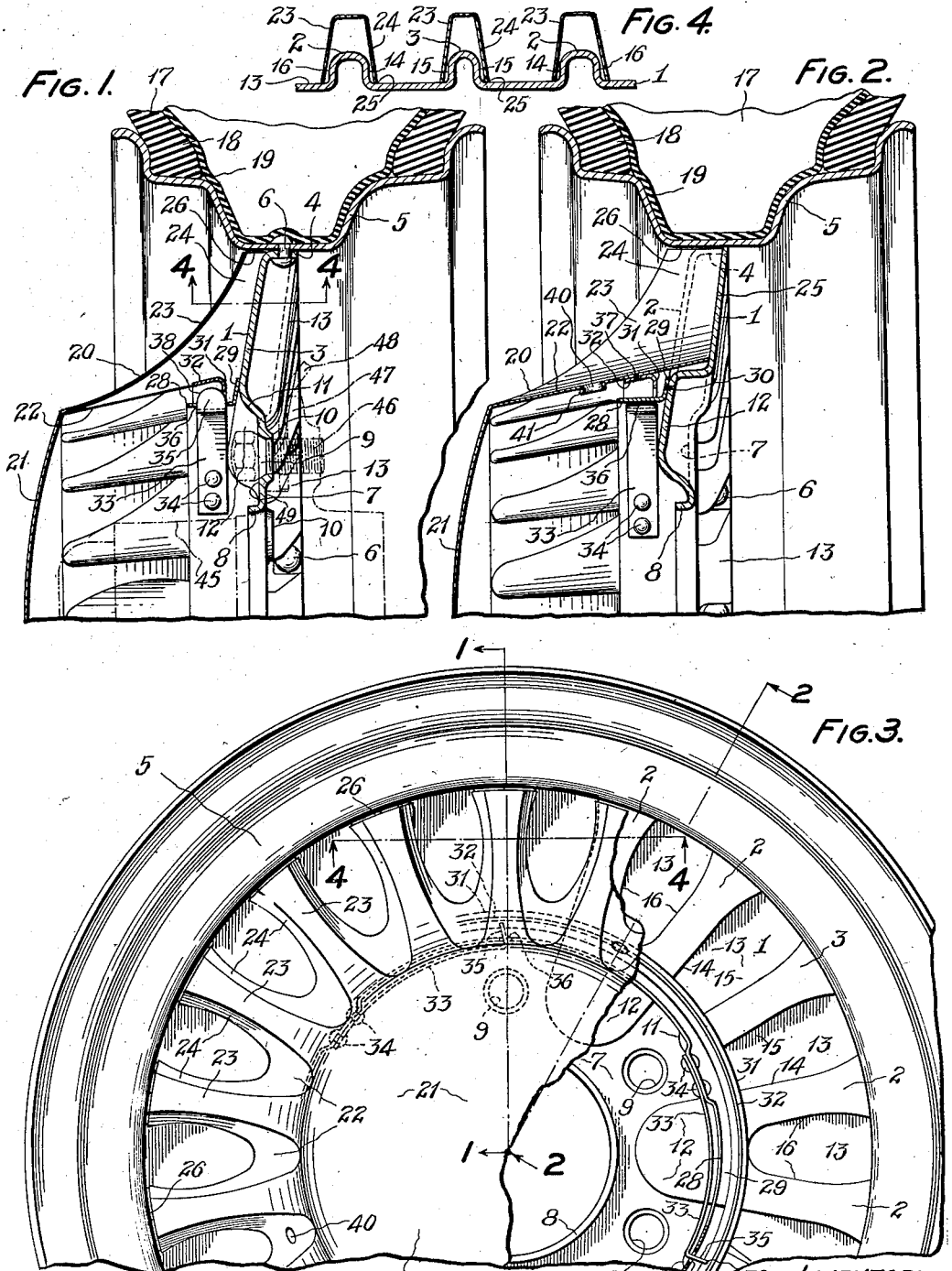
INVENTOR:
Oscar U. Zerk
By Slough and Canfield
ATTORNEYS Patented Aug. 13, 1935

2,011,134

UNITED STATES PATENT OFFICE 2,011,134

WHEEL AND WHEEL COVER

Oscar U. Zerk, Chicago, Ill.

Application December 12, 1932, Serial No. 646,861

2 Claims. (Cl. 301—37)

My invention relates to wheels and the covers therefor.

Although my invention is not limited to any class of wheels, it has particular application to wheels of automotive vehicles.

The present application relates to an improved wheel comprising a demountable wheel body having a relatively simple spider extending radially between the inner hub of the wheel and the supported rim and demountably interconnecting said hub and rim and in addition comprising a relatively light weight thin sheet metal cover superposed over the spider and preferably over the wheel nave construction and in some cases over a portion of the rim, said cover being disposed on the outboard side of the wheel, masking the spider and giving the wheel an appearance having a distinctive æsthetic appeal to the eye. The wheel of the present invention has the valuable advantage that whereas the rim and spider may be of standard form, they may be combined with covers of a variety of forms presenting distinctively different appearances and which are interchangeable for use in connection with a single rim and spider design.

Thus a wheel of this proposed construction not only has the advantage that it is extremely light in weight but has the further advantage that the outer hub and spoke simulating portion, being removably and readily and quickly interchangeable, may be replaced should it accidentally become dented or otherwise injured by collision.

It is therefore an object of my invention to provide an improved automotive vehicle wheel.

Another object is to provide an improved wheel of the class referred to in which the ornamental cover is secured to the load-carrying spider in a quick detachable manner.

Another object is to provide, in a wheel comprising a spider, an improved construction of an ornamental cover attachable to cover the spider or the spider and the wheel rim.

Another object is to provide a wheel of the class described whereof the spider may be made of relatively thin material strengthened by radially arranged relatively deep ribs extending from a point near the outer peripheral rim-engaging portion to a point inwardly of the wheel fastening bolts, and to a point relatively near the inner hub or hub proper of the wheel and increasing in depth inwardly.

Another object is to provide a wheel of the class described having a wheel spider provided with a multiplicity of strengthening ribs radially disposed and generally of U-shape with the legs of the U joined upon radially inward portions.

Another object is to provide a wheel of the class described provided with an improved spoke and hub simulating wheel cover quick-detachably connected to the wheel proper.

Another object is to provide a wheel of the class described comprising a load-carrying spider and a spoke and hub simulating cover, the cover resiliently connected to the spider or to a member associated therewith.

Other objects of my invention will be apparent to those skilled in the art to which my invention appertains.

My invention is fully disclosed in the following description taken in connection with the accompanying drawing, in which:

Fig. 1 is a cross-sectional view of the upper half of a wheel embodying my invention, the view being taken approximately from the plane 1—1 of Fig. 3;

Fig. 2 is a view similar to Fig. 1 but taken from the plane 2—2 of Fig. 3;

Fig. 3 is an outboard elevational view of a wheel embodying my invention with parts thereof broken away for clearness.

Referring to the drawing, I have shown generally at 1 a wheel spider, pressed from sheet metal and formed to provide a plurality of radially extending ribs 2—2 and 3—3. The spider 1 is peripherally circular and at the outer terminations of the ribs 2 and 3, the metal of the spider is pressed to close the ends of the ribs as at 4, Fig. 1. A plurality of outwardly radially closed channel form ribs is thus provided and the closed outer ends of the ribs are all annularly disposed on a diameter substantially the same as the inner diameter of the sheet metal wheel rim shown generally at 5.

The rim 5 and the spider 1 are rigidly joined together by a circular series of rivets 6 projected through aligned perforations in the closed ends 4 of the channel form ribs and in the rim 5. The spider 1 is formed with a generally central annular substantially planar portion 7 from which the ribs 2 and 3 are pressed and radiate. Centrally, the spider is perforated and the metal at the periphery bent to provide an outboardly extending annular flange 8 whereby the spider may be telescoped over a wheel hub construction, indicated at 45, and secured thereto. A circular series of perforations 9—9, preferably provided with peripheral rims, is provided in the portion 7 through which bolts 46 may be projected to rigidly secure the spider upon the hub. Portions of the spider radially outward of the perforations 9—9 may thus be clamped upon a flange 47 of the hub or upon a brake drum flange 48 associated therewith and portions inwardly of the perforations may be clamped upon a corresponding annular face 49 of the hub.

The ribs 3, as shown in Fig. 3, are aligned radially with the bolt perforations 9 and stop inwardly short thereof as shown at 11. The ribs 2—2 proceed inwardly radially and at a point substantially midway between their outer ends and the flange 8 are joined in a relatively wide rib or channel portion 12 which continue inwardly radially substantially to the flange 8, as shown in Figs. 2 and 3.

The ribs 2 and 3 may, if desired, be inclined in the inboard direction as shown in Figs. 1 and 2. The unribbed portions, 13—13, lying between adjacent ribs are relatively flat but inclined as shown in Figs. 1 and 2, and the shape of these portions 13 is defined by confronting concave side portions such as 14—15 and 16—16, Fig. 3, of adjacent ribs. The portions 13 thus are generally oval shape.

The spider 1 constructed as described above combines the maximum of rigidity and strength with the minimum of material. By strengthening relatively thin sheet metal by means of the ribs 2 and 3 and the rib portion 12, and the flange 8, and rigidly joining the outer ends of the ribs to the rim 5, a light-weight but strong wheel spider is provided for transmitting load from a hub secured centrally thereto, to the rim 5 and a tire 17 thereon, comprising the usual casing 18 and inner tube 19. Due to the relatively small diameter of the rim 5 where super balloon tires are used, the outer diameter of the spider 1 is correspondingly small and the metal from which the spider is made may for this reason also be relatively light in weight.

At 20 I have illustrated generally the wheel cover. It is press-formed from sheet metal of relatively thin gauge such as No. 20 U. S. gauge and is formed smoothly to the form to be described, in order that it may be ornamental and to this end is preferably externally plated with chromium.

The cover 20 comprises a central circular portion 21 which may be variously formed but, as illustrated, is slightly convex outwardly in the outboard direction. Extending in the inboard direction from the portion 21 is an outwardly radially diverging outer hub portion 22 and extending radially from the outer hub portion is a relatively large plurality such as eighteen spoke simulating rib-like portions 23. The spoke simulating portions 23 are, as illustrated, formed concave in the outboard direction as well as the circumferential direction on both sides thereof.

The hub portion 22 merges with each pair of adjacent sides of adjacent spoke portions 23 so that, as shown in Fig. 3, the sides of the spoke portions 23 and an intermediate hub portion 22 merge into each other in a continuous curve surface. In the inboard direction, the sides 24—24 of the spoke portions 23 terminate at and engage the relatively flat portions 13 of the spider 1, as for example at 25 in Fig. 2. Thus, as apparent in Fig. 3, a generally oval flat portion of the cover will be visible between adjacent spoke portions 23 when viewed from the outboard direction. Outwardly radially, a small clearance at 26 may be provided between the outer radial ends of the spoke portions 23 and the rim 5.

It will be observed from the above described construction that each spoke simulating portion 23 straddles at its inboard termination one of the ribs 2 or 3 and preferably resiliently contacts the sides of the ribs and thus the cover is interlocked with the spider to prevent relative rotation thereof and to prevent any possibility of looseness or rattling. Obviously, the ribs 2 and 3 are of the same number and the same circumferential spacing as the spoke simulating portions 23.

Means which will now be described is provided to exert axial inboard thrust on the cover 20 to secure it upon the spider in the interlocked positional relation above mentioned. A sheet metal cylindrical collar 28 is secured, coaxially of the wheel spider 1 and the cover 20 by an integral outwardly radially extending flange 29 lying upon the ribs 2 and 3 and the rib portion 12 and rigidly secured thereto as by welding at 30, Fig. 2. Concentric with the collar 28 and outwardly radially slightly spaced therefrom is an annular ring 31 formed from sheet metal, disposed generally in a plane at an angle to the collar 28 and secured to the cover 20 by an integral flange portion 32 extending generally in the outboard direction and, as shown at 37, Fig. 2, welded to radial inner portions of the outer portion 22 of the cover 20.

A plurality of circumferentially spaced resilient elements 33 is provided, preferably formed from flat strip spring metal riveted as at 34—34 upon the radially inner wall of the collar 28, extending circumferentially therearound a suitable distance to provide a suitable resilient movement at the free end thereof and terminating at the free end in outwardly radially extending tongues 35—35 which are projected outwardly radially through corresponding adjacent perforations 36 in the collar 28. The outer radial ends of the tongues 35 are generally rounded as at 38.

The cover is illustrated in its mounted or attached position on the spider 1. To secure it thereon as illustrated, it is moved from an outboard spaced position not shown, whereat the annular ring 31 is to the left of the rounded portions 38 of the springs 33 as viewed in the drawing Fig. 1. Upon moving the cover inwardly, the ring 31 will ride over the rounded portions 38 of the springs resiliently pressing them inwardly and when the ring 31 passes substantially the center of the rounded portions 38, these portions will be thrust outwardly radially by the springs 33 and exert a camming action on the ring 31 tending to move it in the inboard direction. Thus the cover 20 is moved into its assembled position illustrated with the inboard edges as at 13 of the spoke portions engaging the portions 13 as above described and is held securely in this position against outboard displacement by the camming or wedging engagement of the rounded portions 13 of the springs 33 with the ring 31 as will be understood.

When the cover has been thus attached to the spider, a complete wheel of finished ornamental appearance is made.

As stated hereinbefore, the cover 20 is preferably made from thin gauge material and in case of an accident thereto which mutilates it, it may be quickly detached to repair it or substitute a new cover therefor by exerting outboard thrust thereon to cause the ring 31 to ride over and inwardly depress the tongues 35. To apply the outboard thrust thereto, one or more small perforations 40 may be provided into which the end of a hook or like tool may be inserted for pulling in the outboard direction. A suitable location for such perforation 40 is, as illustrated in Figs. 2 and 3, in a portion of the hub portion 22, and if desired the perforations may be formed with inwardly extending annular flanges 41 to reinforce the same.

It will thus be seen that by the foregoing construction I provide a wheel comprising a load supporting spider for securing the rim and a hub proper together, formed regardless of appearance to provide the necessary strength with the very minimum of material and weight; and a cover comprising spoke simulating portions and an outer hub portion and a cap portion made of light gauge material, carrying none of the wheel load, formed to ornamental shape, adapted to be plated to render it aesthetically pleasing and secured to the spider in a readily detachable manner which holds it securely and noiselessly in place on the spider and yet permits of its ready and quick removal for replacement purposes in case of damage thereto.

To add to the aesthetic appearance of the wheel, the portions 13 of the spider may be painted preferably black or some color contrasting to that of the adjacent spoke simulating portions of the cover.

My invention is not limited to the exact details of construction shown and described inasmuch as many changes and modifications may be made within the scope and spirit of the invention without sacrificing its advantages.

I claim:—

1. A cover plate for disc type wheels provided with spaced resilient securing elements on the outer face thereof, said cover plate comprising a generally outwardly dished body having a peripheral portion terminating adjacent the inner face of the wheel rim base, and generally radially extending axially inward portions engageable with the disc outer face, the inner face of the cover plate having an annular generally radial flange engageable by the resilient securing elements, said flange being spaced radially inwardly and axially outwardly of said disc engageable portions.

2. A cover for disc type wheels comprising a generally outwardly dished body having a peripheral portion terminating adjacent the inner periphery of the wheel rim base, and generally radially extending inward portions engageable with outer portions of the disc, and mutually resiliently latching elements on the inner side of the cover and on the outer side of the disc engageable and disengageable by relative axial movement of the cover and disc, disposed inwardly radially and axially outwardly of the engageable inward portions of the cover.

OSCAR U. ZERK.